United States Patent [19]

Saha et al.

[11] 3,774,647

[45] Nov. 27, 1973

[54] LINE STOPPING ASSEMBLY USING AN INFLATABLE ELEMENT

[75] Inventors: Narayan C. Saha, Joseph Daghe, both of Decatur, Ill.

[73] Assignee: Mueller Co., Decatur, Ill.

[22] Filed: Nov. 4, 1971

[21] Appl. No.: 195,561

[52] U.S. Cl...................... 138/94, 138/94.5, 138/93
[51] Int. Cl............................................. F16l 55/10
[58] Field of Search...................... 138/94.3, 93, 89, 138/94.5, 94, 97; 166/122, 129; 73/40.5

[56] References Cited
UNITED STATES PATENTS

| | | | |
|---|---|---|---|
| 3,665,966 | 5/1972 | Ver Nooy | 138/94 |
| 3,438,608 | 4/1969 | Wood | 257/299 |
| 3,908,286 | 10/1959 | Hallstrom | 251/299 |
| 3,537,483 | 11/1970 | Teague | 138/93 |
| 2,812,778 | 11/1957 | Ver Nooy | 138/94 |
| 3,401,720 | 9/1968 | Telford | 138/97 |

*Primary Examiner*—Samuel B. Rothberg
*Assistant Examiner*—Steven M. Pollard
*Attorney*—John W. Malley et al.

[57] ABSTRACT

An apparatus for plugging a conduit carrying a fluid under pressure is provided and which is structured to cooperate with a valved fitting of the type used in forming a lateral opening in the conduit and which is sealingly mounted on the exterior of the conduit; a carrier member is adapted to be secured to the fitting above the gate valve carried on the fitting; a plug element having an inflatable member is pivotally attached to an elongated spindle which extends through a sealed opening in the carrier member; a hollow support spindle is carried on the carrier member about the first mentioned spindle and which supports at its lower end a hub member which engages and rests upon the rim of the opening formed by the cutter; the plug element on its periphery is hingedly attached to the interior of the hub member so that movement of the first mentioned spindle transversely of the longitudinal axis of the conduit will move the plug element from its retracted position to its operating position; fluid passages are provided on the carrier member, between the spindles and a flexible hose member to supply and exhaust a gas under pressure to and from the inflatable member.

4 Claims, 2 Drawing Figures

United States Patent [19]
Saha et al.
[11] 3,774,647
[45] Nov. 27, 1973
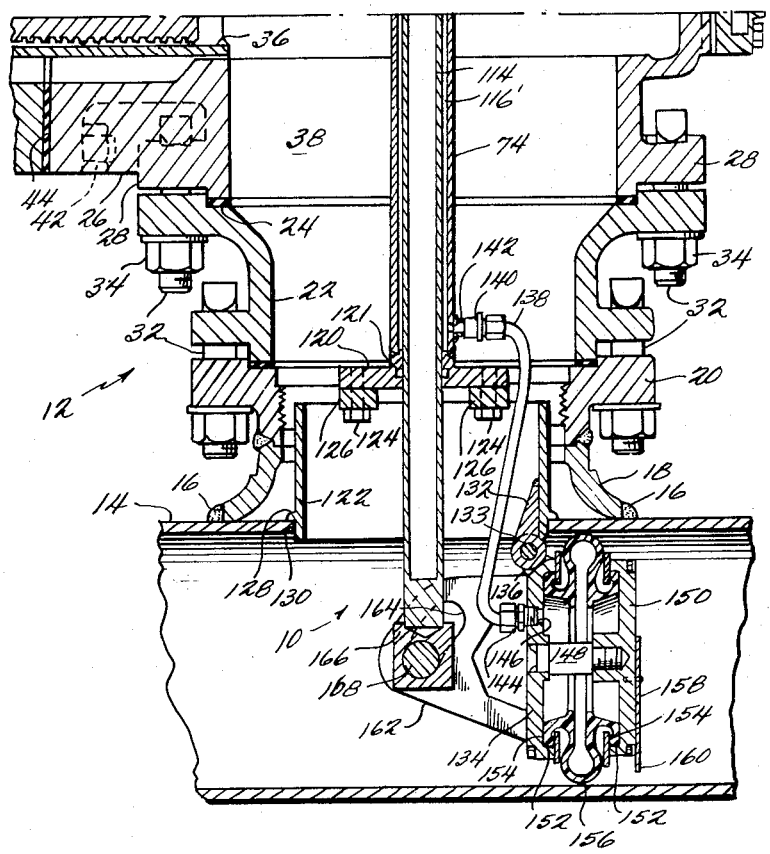

LINE STOPPING ASSEMBLY USING AN INFLATABLE ELEMENT

BACKGROUND AND BRIEF DESCRIPTION OF THE INVENTION

The present invention relates to pluggers for pipelines and, more specifically, to a plugging apparatus of the type that is manually operated and which employs an annularly shaped inflatable member to stop fluid flow in a conduit.

The necessity of stopping fluid flow in a conduit most often arises as a result of the need for repairs or for the purpose of extending a line by adding one or more branches thereto so that the location at which a plugging operation is required cannot in practical terms be anticipated with any useful precision when the fluid to conduit system is initially installed in the ground. To meet the necessity of plugging a line at a random point, efforts have been directed toward the provision of pipe plugging apparatus which can be operated in cooperation with valved hole cutter fittings thus enabling the plugging of pipes which are conveying a fluid under pressure.

One of the problems encountered in plugging a pipe carrying a pressurized fluid has been the proper positioning of the plug element in the line so as to achieve a good seal. To overcome this problem, it has been the practice to employ in some arrangements relatively rigid or non-expansible plug elements such as those disclosed in U.S. Pat. Nos. 2,906,295, 3,025,885, and 2,886,068 to Ver Nooy. With these and other similar arrangements, the plug element is formed to be of a size slightly larger than the diameter of the pipe to be stopped so that the possibility of incorrectly disposing the plug element will be minimized. It is apparent, of course, that, in order to be able to insert such a plug element through the pipe walls, a relatively large diameter cut must be made which frequently renders necessary the installation of reinforcing members about the exterior of the cut out portion of the pipe since such large cuts tend to weaken the normal structural integrity of the pipe.

While the utilization of expansible sealing elements in place of the non-expansible type discussed above has to a large extent eliminated the necessity of installing reinforcing members and thus has resulted in time and cost savings, since a significantly smaller opening could be cut in the pipe, attempts to obtain the correct positioning of the expansible type plug in the pipe have not proved satisfactory particularly where the pipe is carrying the fluid under pressure.

One source of difficulty can be seen to reside in the difference between the sizes of the internal diameter of the pipe and the unexpanded diameter of the plug which difference permits the plug to assume an off-center or other mis-aligned position in the pipe thus increasing the chances of effecting an imperfect seal.

In endeavoring to overcome this problem, the prior art has employed a variety of types of lever arms or articulated linkage arrangements to enable a workman to manipulate the plug element to position it in proper alignment in the pipe so that when the pipe element is expanded a tight seal will be achieved. Where a pipe to be stopped contains a pressurized fluid, however, many of these prior art arrangements have not been able to be readily adapted to plug such lines since visual observation of the plug has been necessary to enable a workman to manually locate the plug properly in the pipe. Other arrangements have employed cumbersome and costly mechanisms to fit the plug in position, the operation of which has consumed an undesirable amount of man hours.

The improvements of the present invention provide useful solutions to the problems recognized in the prior art as well as advantages which assure the obtaining of an excellent fluid tight seal upon each operation of the device.

In a preferred embodiment of this invention, a valved fitting having a through bore is secured by any suitable means to the exterior of a conduit so as to form a fluid tight seal therewith. Preferably, the fitting is of the type that will accommodate a drilling mechanism that is used to form a lateral opening in the conduit. With this arrangement, subsequent to the drilling of an opening in the conduit, the cutting member is withdrawn and the valve closed to prevent the escape of the pressurized fluid. Subsequently, the drilling device is detached from the fitting and the carrier member of the line stopping apparatus of the present invention is mounted on the fitting in sealing engagement therewith. The carrier member comprises a plate element having a centrally formed bore or opening which when the carrier member is mounted on the fitting is in alignment with the center of the opening formed in the conduit. Movably disposed in the bore of the plate is an outer, hollow elongated spindle member which is mounted to be movable transversely of the plate member. The end of the outer spindle member which is located within the fitting has a circular hub secured thereto which is of a size to closely interfit with the opening formed in the pipe. The exterior of the hub is provided with abutment means to limit the insertion of the hub into the opening in the conduit. Suitable sealing means, of course, are provided for engaging the exterior of the outer spindle to prevent the escape of the pressurized fluid. To the interior portion of the hub there is secured pivot means for mounting a disk element which is used to support an annular, inflatable plug member. Thus, it can be seen that the hub functions as a support means for the pivot means of the disk element and that the disc element operates as a support member for the inflatable plug member. Extending through the hollow outer spindle is an inner spindle or shaft which is pivotally attached at its lower end to the rear face of the disk element which carries the inflatable plug member. Thus, it can be seen that the inner spindle 114 will operate as a movable positioning means for the disk element carrying the inflatable plug member. The exterior diameter of the inner spindle is less than the interior diameter of the hollow spindle so that a passage is formed therebetween which is utilized to convey pressurized fluid to the interior of the inflatable plug member from an appropriate source externally of the fitting. Suitable means are provided on the exterior face of the plate of the carrier member to permit the adjustable positioning of the inner and outer spindles relative to the opening in the conduit and markings may be provided on the exterior surfaces of the spindles to facilitate their positioning.

With the foregoing arrangement, and in particular, the provision of an abutment means on the hub which carries the pivot axis of the inflatable plug member, the inflatable plug member can be positioned substantially concentrically with respect to the axis of the conduit by simple manipulation of the inner spindle so that when pressurized fluid is supplied to the interior of the inflatable member, an excellent fluid tight seal can be achieved upon each operation of the device.

One of the principle features of the present invention, therefore, resides in the provision of a member capable of precisely locating the hinge axis constituting mounting means for a disk supporting the plug member so that the plug member can be disposed with great accuracy in its operative position and yet which does not require time consuming manual manipulation or visual observation of the plug member in order to achieve an effective fluid tight seal. Another advantageous feature which evolves from the above described structure of the carrier member is the capability of employing a smaller diameter plug member which is expansible to plug the conduit thus eliminating the necessity of cutting large diameter openings in a conduit which has the potentiality of undesirably weakening the conduit.

The foregoing and other features and advantages will become apparent in the more detailed discussion which follows and, in that discussion reference will be had to the accompanying drawings wherein FIG. 1A is the top portion and FIG. 1B is the bottom portion of a cross-sectional view in elevation looking transversely to the longitudinal axis of a conduit illustrating the line plugging apparatus of the present invention installed on a valved fitting.

DETAILED DESCRIPTION OF THE INVENTION

Figure 1A:
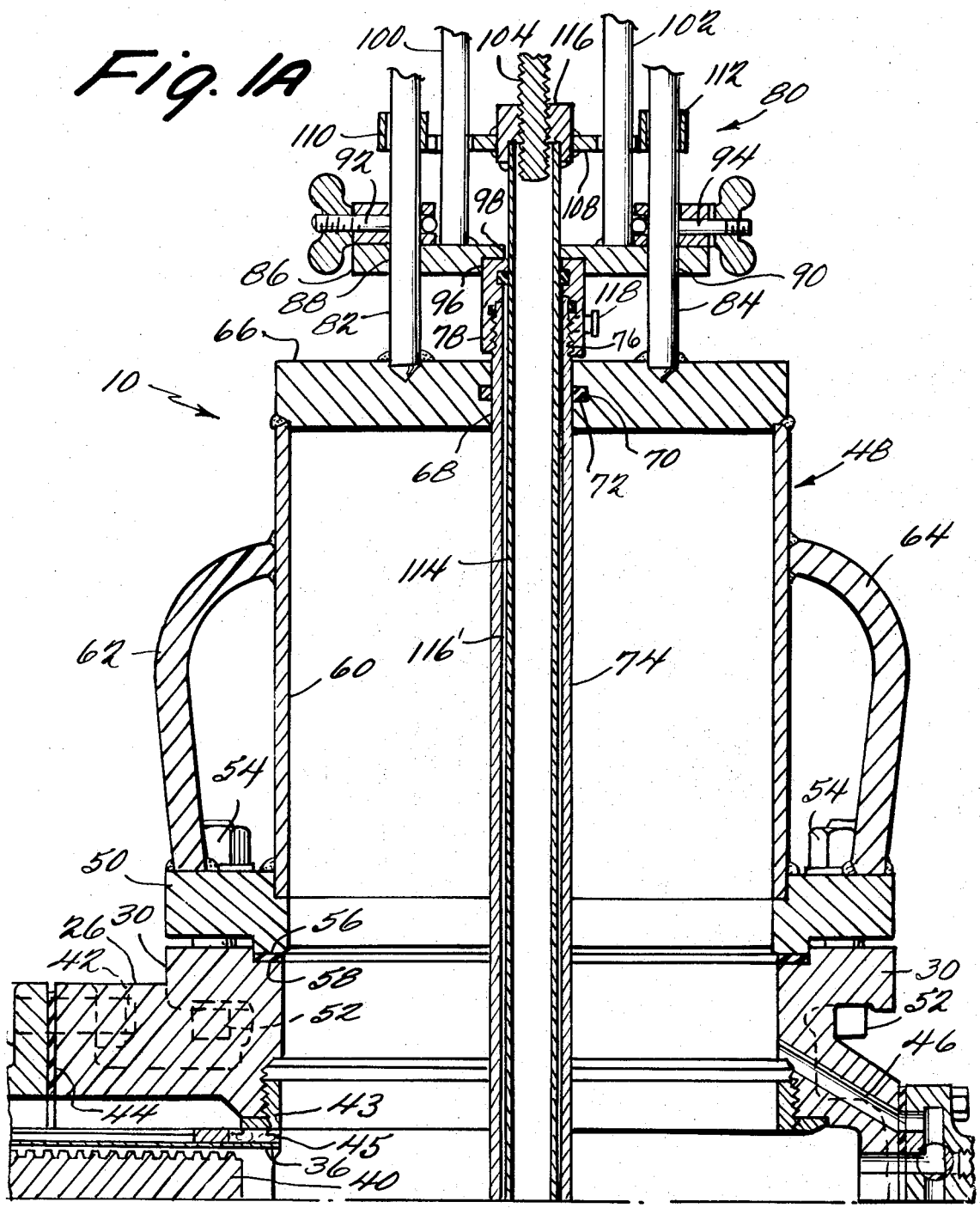

Referring now to the drawing, there is shown in FIG. 1, (A and B), the line stopping apparatus 10 of the present invention mounted on a fitting 12 which is secured on the exterior of a conduit 14 by any suitable means which will form a fluid tight seal as by a weld indicated at 16. The fitting 12 consists of a bottom section 18 which is of an annular shape and to which is secured as by welding an annular flanged section 20 to which is bolted a flanged section 22. The flanged section 22 is provided with a shoulder 24 which carries an annular gasket which, in turn, supports a valve housing 26. The valve housing 26 is formed with radial extending ears 28 on its lower portion and 30 on its upper portion. Section 22 is provided with bores (not shown) for mounting threaded bolts 32 which are formed with hooked portions at one of their ends which engage the ears 28 so that when the nuts 34 are tightened on the bolts 32 the valve housing 26 will be securely held in place on section 22. In the illustrated embodiment, section 22 is mounted on the lower section 18 in a similar manner with hooked bolts 32 but it will be understood by those skilled in the art that other fastening means may be employed.

The valve housing 26 is of the type having a hollow gate valve member 36 mounted for movement generally transversely of the opening 38 of the fitting by means of a threaded interengagement (not shown) with an advancing screw 40 which extends through suitable sealing members externally of the housing 26 for manual manipulation. A valve seat 43 of annular shape is provided on the upper portion of the valve housing 26 for cooperation with resilient sealing material indicated at 45 which is embedded in the upper face of the hollow gate valve member 36 In this embodiment, the gate valve member 36, advancing screw 40 and the portion of the housing 26 carrying these elements, may be detachably connected to housing 26 as by the nut and bolt fasteners 42 with a flat annular gasket seal 44 being interposed betwen the detachable sections. Housing 26 may be provided with a valved by-pass passage 46 as is conventional in this type of apparatus.

Mounted on the side of valve housing 26 which faces away from the conduit 14 is the carrier member 48 which consists of an annular ring member 50 which is secured to the radially extending ears 30 of the valve housing by means of the hooked ends of bolts 52. Nuts 54 are employed to tighten the inner shoulder 56 of the ring member 50 down on gasket member 58 to form a fluid tight seal. A cylindrical sleeve 60 is formed integrally with or welded to (as illustrated) ring member 50 and to which handles 62 and 64 are attached as by welding. The end of sleeve 60 opposite ring member 50 is closed by a circular plate 66 which also may be secured thereto by welding to form a fluid tight seal. A bore or opening 68 is formed through the center of plate 66 and a groove 70 formed about the wall of the bore 68 for carrying an O-ring type seal 72.

A hollow outer spindle 74 is disposed to extend through bore 68 and has an exterior diameter such that the O-ring seal 72 engages the exterior surface of the spindle 74 to prevent escape of pressurized fluid through the clearance between the wall of the bore or opening 68 and the exterior surface of the spindle 74. The upper exterior end 76 of the spindle 74 is provided with threads and an interiorly threaded tube section 78 is threadedly engaged on the end 76.

A spindle support bracket 80 is mounted on the exterior face of plate 66 and consists of two rods 82 and 84 which are rigidly secured to the face of plate 66 to extend perpendicularly therefrom on opposite sides of the bore 68. A plate member 86 is slidably positioned on rods 82 and 84 by means of rod receiving bores 88 and 90 and adjustable set screws 92 and 94. Tube section 78 is secured in a recess 96 which surrounds an opening 98 formed in plate member 86 through its center. Rods 100 and 102 are welded or otherwise rigidly secured to the upper face of plate member 86 to extend generally perpendicularly therefrom on opposite sides of the bore 90 and bore 88 so that rods 100 and 102 lie along a line passing through the center of bore 98. At the upper ends of rods 100 and 102 (not shown) there is supported a transversely extending plate which rotatably supports a feed screw, the lower end of which is shown at 104. A plate member 108 having guide slots 110 and 112 on its outer ends through which pass rods 82 and 84 respectively, carries the hollow inner spindle 114 which is suitably secured as by welding to a cap member 116 which is formed with a threaded bore for receiving the feed screw 104. Openings are provided in the plate 108 through which are disposed the rods 100 and 102.

The inner spindle 114 extends within the outer spindle 74 and the exterior diameter of the inner spindle 114 is smaller than the interior diameter of the outer spindle 74 to provide an annular passage 116' between the two spindles along their length. Fluid under pressure may be supplied to this annular passage 116' through a closable inlet 118 formed through tube section 78 and the upper end of the outer spindle 74.

The lower end of the outer spindle 74 is provided with a flange 120 which carries an O-ring seal 121 for sealingly engaging the exterior of the inner spindle 114 passing therethrough. A ring shaped hub 122 is secured to flange 120 by bolts 124 which are disposed through bars 126 secured across one end of the hub 122 by welding. The lower exterior surface of the hub 122 is provided with an integrally formed bead 128 so that, with the exterior surface of the hub having an exterior diameter such that the hub will closely interfit with an opening 130 which has been cut in the conduit 14, the bead 128 will limit the extent to which the hub 122 can be inserted into the opening 130.

Attached as by welding to the interior surface of the hub 122 is a pin supporting member 132 which carries a pivot pin 133 in a fixed position relative to the lower edge of the hub 122. An annular disk 134 is formed with a pair of spaced ears, one of which is indicated at 136 which have aligned openings for receiving pin 133 so as to pivotally support the disk 134.

It will thus be seen that member 132 and pin 133 constitute a mounting means for disks and the plug member 156 and that the hub 122 constitutes a support means for the mounting means 132 and 133.

A flexible tube 138 is connected at one end through a connector 140 to the annular passage 116' by means of an opening 142 formed in the wall of outer spindle 74 and at the other end to a connector 144 which is threaded into an opening 146 formed through disk 134.

Figure 1B:
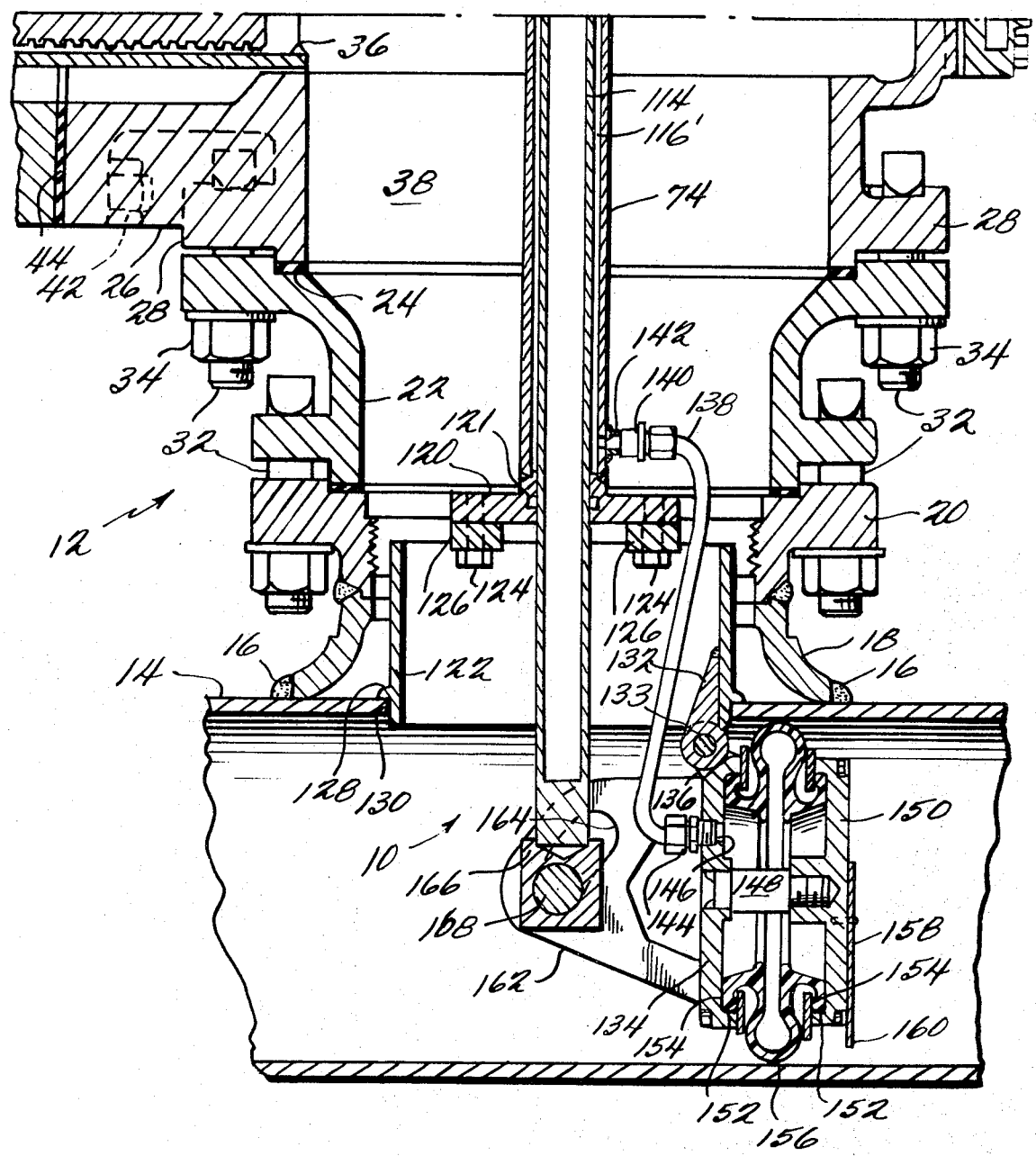

A support stud 148 is suitably secured as by welding or a threaded connection in a bore formed in the center of disk 134 at one end thereof and at its opposite end has a disk 150 threaded thereon or otherwise suitably secured thereto. Both disks 134 and 150 are formed with annular grooves 152 in which are located the enlarged annular lip portions 154 of an inflatable plug member 156 which is made of a resilient material such as rubber or other suitable material which will be resistant to deterioration when contacted by the fluid carried in the conduit 14. As illustrated in FIG. 1B, the plug member 156 is shown in its uninflated or relaxed condition. It will thus be seen that the two disks 134 and 150 which are joined together by stud 148 constitute a support member for the inflatable plug member 156.

The exterior face of the disk 150 has attached thereto a plate segment 158 which extends radially outwardly beyond the face of disk 150 so that when the disk is pivoted about pin 133 the outer edge will scrape along the bottom interior surface of the conduit 14 to remove any debris or shavings remaining from the hole cutting operation.

On the exterior face of disk 134 there is secured a bracket 162 which is formed with a slot 164. To the lower end of the inner spindle 114 there is secured as by welding a block member 166 which carries a pin 168 in a bore formed therethrough. The pin 168 passes through slot 164 to form an articulated connection between the inner spindle 114 and disk 134. The pin 168 may be held in place by offsetting its opposite ends or by providing threaded surfaces for retaining nuts. It will thus be seen that the inner spindle 114 constitutes a movable positioning means for the support member or disks 134 and 150 of the pipe plugging member 156.

In operation, with the gate valve member 36 in its closed position, the hole cutting apparatus may be removed from the valve housing 26 and the carrier member 48 mounted thereon with the spindle 74 and 114 retracted to a position where the hub 122 and inflatable plugging element are within sleeve 60. It should be noted that the rods 82 and 84 are of sufficient length to support the spindles in their retracted position wherein the inner positioning spindle 114 is moved transversely of plate member 86 so that the bracket 162 is located within hub 122. Subsequently, the gate valve is opened and the set screws 92 and 94 loosened so that the entire spindle support bracket 80 can be lowered to move both spindles 74 and 114 towards the opening 130 formed in the conduit 14 until the bead 128 abuts the exterior surface of the conduit 14 whereupon the set screws 92 and 94 are tightened on rods 82 and 84. It should be understood that the mounting of carrier member 48 on the valve housing 26 is carried out so that the inflatable plug member 156 will be accurately aligned with the longitudinal axis of the conduit 14 when moved to its operating position. Prior to installation of the apparatus, suitable markings may be placed on the exterior of inner positioning spindle 114 adjacent its upper end so that movement of the spindle relative to the plate member 86 (for example) may be utilized to determine the amount of pivoting of the bracket 162 and disk elements 134 and 150 relative to the pivot pin 133. As previously noted, rotation of the feed screw 104 will effect the movement of inner spindle 114 so as to move the inflatable plug 156 between its retracted and operating positions. When the plug 156 is in its operating position, its center should be substantially coincident with the longitudinal axis of the conduit 14. Fluid under pressure such as an inert gas may be supplied through inlet 118, annular passage 116', flexible tube 138 to the interior of the inflatable plug member so that the plug member will expand to form a fluid tight seal about the interior surfaces of the conduit 14 adjacent thereto. Removal of the plug element 156 is effected by carrying out the foregoing steps in reverse order.

It should be understood that other types of arrangements for feeding the inner spindle 114 relative to the outer spindle 74 may be provided, if desired, and that the foregoing is only an example of one embodiment, other types being readily apparent to those skilled in this art.

The respective fittings, carrier member and disks may be constructed from cast metal as is conventional in this art and in a manner that will also be understood by those skilled therein. As previously discussed, the plugging apparatus of this invention permits very precise location of the plugging element so that a fluid tight seal will be achieved where visual observation of the plugging element is not possible and manual handling of the plugging element is not practical. It will be understood, of course, that the present invention is capable of numerous modifications as will be obvious to those skilled in this art and such modifications are intended to be included within the scope of this invention as defined in the appended claims.

What is claimed is:

1. A pipe plugging assembly for use with a fitting of th type having a through bore, a first open end for surrounding a lateral opening formed in a pipe and a second open end spaced from said first end, said assembly comprising:
   a carrier member having means for closing the second open end of the fitting,
   an inflatable pipe plugging element,
   a pair of spaced apart discs for supporting said inflatable pipe plugging element,
   an annular hub member having an exterior surface and abutment means formed on said exterior surface, said hub member having a diameter such that said hub member will interfit with a lateral opening formed in the pipe, a pivot pin fixedly supported on the interior surface of said hub member, one of said discs being pivotally mounted on said pin, said carrier member having an opening therethrough, movable positioning means extending through said opening in said carrier member and having a portion connected to said pivotally mounted disk so that, when said positioning means are moved relative to said opening in said carrier member, said pipe plugging element supported on said disks will be moved between a pipe plugging position and a retracted position on said pivot pin.

2. The pipe assembly as claimed in claim 1 wherein said disks have a connecting member interconnecting said disks in fixed, spacd apart relation to one another and said inflatable pipe plugging element comprises a flexible ring-shaped annulus having spaced apart annular surfaces, each of said annular surfaces engaging and being supported by one of said disks, a first one of said disks being connected to said pivot pin.

3. The pipe plugging assembly as claimed in claim 2 wherein said abutment means on said exterior surface of said hub member comprises a bead formed circumferentially about said exterior surface for engaging the exterior surface of the pipe to limit the extent to which said hub member can be inserted into the opening in the pipe, said hub being secured to a hollow, elongated spindle having a first and a second end, said carrier member having a first and second side, said first end of said spindle being secured to said hub and being disposed on said first side of said spindle, at least a portion of said spindle being disposed in said opening in said carrier member with said second end of said spindle being on said second side of said carrier member, said opening in said carrier member having means for sealingly engaging said portion of said spindle disposed therein.

4. The pipe plugging assembly as claimed in claim 2 wherein the second of said disks is provided with a plate segment having a portion extending radially outwardly from said disk to an extent such that when said pipe plugging assembly is mounted on a said fitting, and said plugging element is moved from said inoperative to said operative position, said plate segment will engage the interior surface of the pipe along at least a portion of its pivotal travel.

* * * * *